United States Patent
Satake et al.

(10) Patent No.: US 12,480,883 B2
(45) Date of Patent: Nov. 25, 2025

(54) ANALYSIS DEVICE FOR DETERMINING A PARTICULAR COMPONENT OF URINE

(71) Applicant: ARKRAY, Inc., Kyoto (JP)

(72) Inventors: Seiji Satake, Kyoto (JP); Maiho Kitajima, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 137 days.

(21) Appl. No.: 18/461,011

(22) Filed: Sep. 5, 2023

(65) Prior Publication Data

US 2024/0085339 A1    Mar. 14, 2024

(30) Foreign Application Priority Data

Sep. 12, 2022    (JP) .................................. 2022-144827

(51) Int. Cl.
| | | |
|---|---|---|
| G01N 21/78 | (2006.01) | |
| G01N 21/84 | (2006.01) | |
| G01N 33/493 | (2006.01) | |
| G01N 35/00 | (2006.01) | |

(52) U.S. Cl.
CPC ......... *G01N 21/78* (2013.01); *G01N 21/8483* (2013.01); *G01N 33/493* (2013.01); *G01N 35/00029* (2013.01); *G01N 2035/00108* (2013.01); *G01N 35/00613* (2013.01)

(58) Field of Classification Search
CPC .................. G01N 21/78; G01N 33/493; G01N 35/00029; G01N 35/00613; G01N 35/00623; G01N 2035/00108; G01N 21/8483; G01N 21/01; G01N 33/48785; G01N 2021/1765; A61B 2562/0295; A61B 10/007; A61B 2010/0006; A61B 10/0045

See application file for complete search history.

(56) References Cited

U.S. PATENT DOCUMENTS

| | | | |
|---|---|---|---|
| 2008/0267446 A1 | 10/2008 | Capewell | |
| 2011/0000763 A1 | 1/2011 | Kimura et al. | |
| 2012/0244624 A1 | 9/2012 | Hsiao | |
| 2013/0071939 A1* | 3/2013 | Nakajima | G01N 33/493 |
| | | | 436/96 |

(Continued)

FOREIGN PATENT DOCUMENTS

| | | | |
|---|---|---|---|
| JP | 2000-321270 A | 11/2000 | |
| JP | 3536268 B2 | 6/2004 | |

(Continued)

OTHER PUBLICATIONS

Extended European Search Report mailed on Feb. 6, 2024 for EP Application No. 23196516.1, 11 pages.

*Primary Examiner* — Georgia Y Epps
*Assistant Examiner* — Erin R Garber
(74) *Attorney, Agent, or Firm* — Young Basile Hanlon & MacFarlane, P.C.

(57) ABSTRACT

An analysis device includes a measurement unit that measures a color state of a test strip under a defined condition, an imaging unit that captures an image of the color state of the test strip, an analysis unit that analyzes the color state from the captured image obtained by imaging by the imaging unit, and a switching unit that selectively switches between a first mode in which the measurement unit measures the color state and a second mode in which the analysis unit analyzes the color state from the captured image.

14 Claims, 12 Drawing Sheets

(56) References Cited

U.S. PATENT DOCUMENTS

| | | | |
|---|---|---|---|
| 2015/0211987 A1* | 7/2015 | Burg | G01N 21/274 356/402 |
| 2017/0191941 A1 | 7/2017 | Hosotani et al. | |
| 2019/0101742 A1* | 4/2019 | Nakajima | G02B 21/06 |
| 2020/0386753 A1 | 12/2020 | Somes et al. | |
| 2021/0022646 A1* | 1/2021 | Li | G06F 18/22 |
| 2022/0185337 A1* | 6/2022 | Ming | B60W 60/0057 |
| 2023/0216999 A1* | 7/2023 | Zobel | G06T 5/60 348/42 |
| 2023/0408418 A1* | 12/2023 | Hopper | G01N 33/726 |

FOREIGN PATENT DOCUMENTS

| | | |
|---|---|---|
| JP | 2009-229233 A | 10/2009 |
| JP | 2012-202989 A | 10/2012 |
| JP | 2013-024797 A | 2/2013 |
| JP | 5770724 B2 | 8/2015 |
| JP | 5785933 B2 | 9/2015 |

* cited by examiner

ANALYSIS DEVICE FOR DETERMINING A PARTICULAR COMPONENT OF URINE

CROSS-REFERENCE TO RELATED APPLICATION

This application is based on and claims priority under 35 USC § 119 from Japanese Patent Application No. 2022-144827 filed on Sep. 12, 2022, the disclosure of which is incorporated by reference herein.

TECHNICAL FIELD

The present disclosure relates to an analysis device.

BACKGROUND

Regarding an analysis device, for example, Japanese Patent Publication (JP-B2) No. 3536268 discloses a urine test strip used for a urine inspection and determined by a human visually reading a result of the inspection. The multi-item urine test strip includes a support and a plurality of detection sites provided on the support, and a color change of the detection sites is compared with a color sample to make a determination by visual observation.

Furthermore, Japanese Patent Publication (JP-B2) No. 5770724 describes a urine analysis method for analyzing urine using a reagent. This urine analysis method includes a first determination step of determining whether a specific component is positive or negative based on a color reaction between the specific component in urine and a reagent, and a step of obtaining data of an absorption characteristic of the urine itself with respect to light in a predetermined wavelength range. This urine analysis method further includes a second determination step of, when a value of the data of the absorption characteristic is within a predetermined range and a result of the determination in the first determination step is a predetermined one of either positive or negative, correcting the determination result to a false positive or a false negative, or determining that there is a possibility of a false positive or a false negative.

Furthermore, Japanese Patent Application Laid-Open (JP-A) No. 2012-202989 describes a test strip reading and analyzing system realized by using a portable device. The test strip reading and analyzing system includes a portable device including a test strip unit including a reaction area for an inspection item, an image capturing module that captures a test strip image of the test strip unit, and a transmission module electrically connected to the image capturing module, and a remote computing device in which a test strip analyzing system that analyzes the test strip image and creates an inspection report is installed. The test strip image captured by the image capturing module is transmitted to the remote computing device by the transmission module, and the inspection report is returned to the portable device by the remote computing device.

Meanwhile, in a facility such as a hospital that uses an analysis device that measures a color state of a test strip spotted with a biological sample as a specimen as described above, a backup machine capable of the same type of measurement is often prepared in preparation for a case where measurement cannot be performed by the analysis device.

However, preparing the backup machine places a large burden on a user due to high cost, necessity of securing an installation place, and the like. For this reason, an analysis device capable of analyzing a test strip without preparing a backup machine is desired.

SUMMARY

The present disclosure has been made in view of the above points and provides an analysis device including a measurement unit that measures a color state of a test strip under a defined condition, the analysis device being capable of analyzing the test strip without using the measurement unit.

An analysis device according to one aspect of the present disclosure includes a measurement unit that measures a color state of a test strip under a defined condition, an imaging unit that captures an image of the color state of the test strip, an analysis unit that analyzes the color state from the captured image obtained by imaging by the imaging unit, and a switching unit that selectively switches between a first mode in which the measurement unit measures the color state and a second mode in which the analysis unit analyzes the color state from the captured image.

DETAILED DESCRIPTION

Hereinafter, an example of a mode for carrying out the technology of the present disclosure will be described in detail with reference to the drawings. Note that components and processes having the same operation, action, and function are denoted by the same reference signs throughout the drawings, and redundant description may be omitted as appropriate. Each drawing is only schematically illustrated to the extent that the technology of the present disclosure can be sufficiently understood. Therefore, the technology of the present disclosure is not limited only to the illustrated example. Furthermore, in the present embodiment, description of configurations that are not directly related to the present disclosure or well-known configurations may be omitted.

First, a specific configuration example of an analysis device according to the present embodiment will be described with reference to FIGS. 1 to 5.

Figure 1:
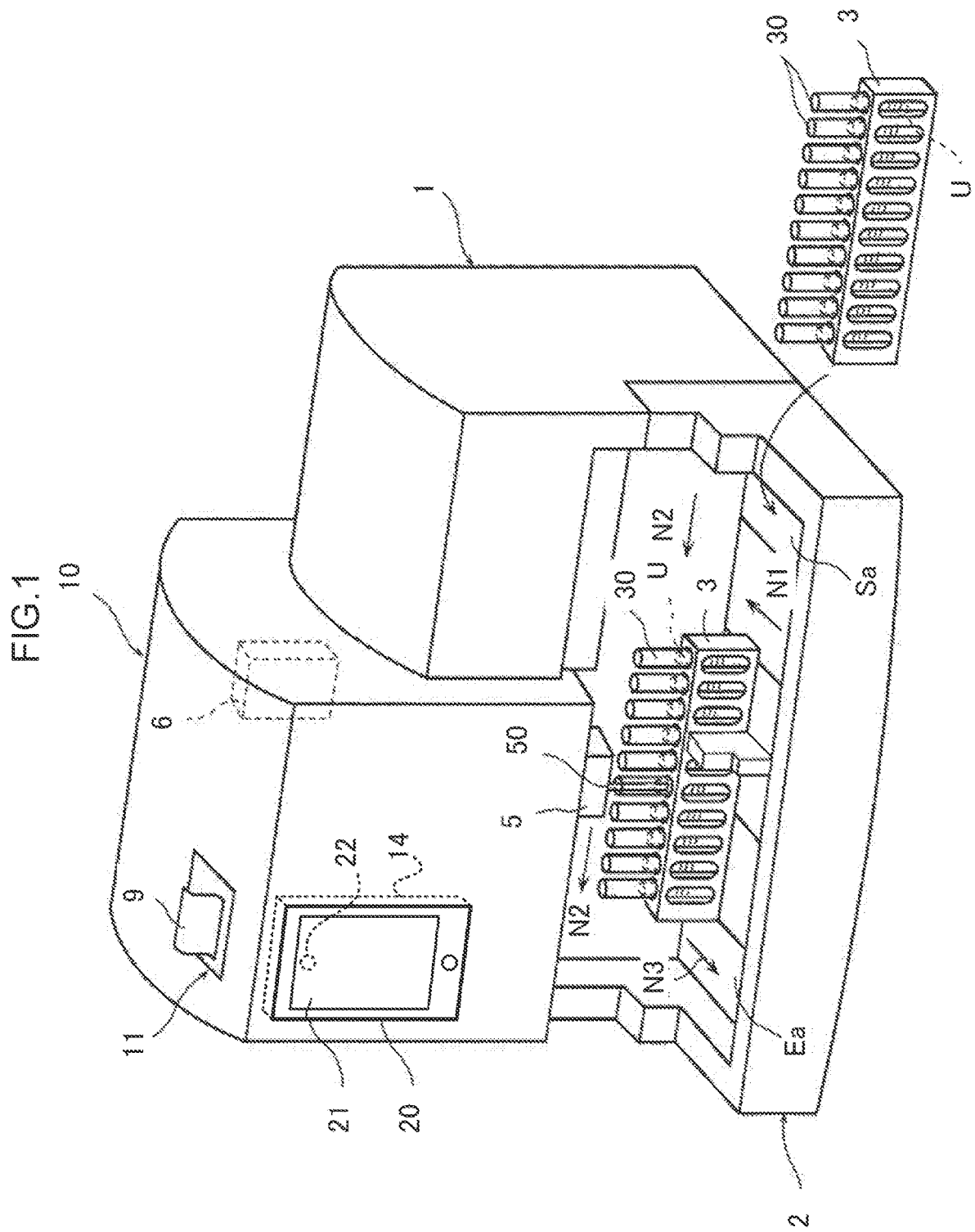
FIG. 1 is a schematic perspective view illustrating an example of an analysis device according to an embodiment.

FIG. 1 is a schematic perspective view illustrating an example of an analysis device 10 according to the present embodiment.

As illustrated in FIG. 1, the analysis device 10 illustrated in the present embodiment integrally includes a main body 1, a conveyance device 2, and an operation unit 20. The analysis device 10 is, for example, for performing analysis processing of urine U contained in a container 30. The analysis device 10 has a configuration in which the conveyance device 2 is assembled to a front surface portion of the main body 1.

Note that in a case where the urine U is to be analyzed, a test strip to be adopted is, for example, a urine test strip including a reaction area of a large number of inspection items for inspecting inspection items such as urine protein, urinary ketone bodies, and urine sugar. A specimen to be analyzed is not limited to the urine U, and the specimen may be a biological component other than the urine U (for example, blood, plasma, saliva, and the like). Furthermore, the specimen may be a liquid for water quality inspection.

The conveyance device 2 is a device for conveying a rack 3 holding the container 30 in an upright position along a fixed path. The conveyance device 2 can have a similar configuration to that of a conventionally known conveyance device (for example, a conveyance device described in Japanese Patent Application Laid-Open (JP-A) No. 2009-229233), and details of a specific structure thereof will be omitted. In the conveyance device 2, when the rack 3 is input into a predetermined starting end area Sa, the rack 3 is sequentially conveyed in directions indicated by arrows N1 to N3, and finally reaches a predetermined terminating end area Ea. In the process in which the rack 3 is conveyed in the direction of the arrow N2, an operation of collecting the urine U from the container 30 is performed by a suction nozzle 50 described later.

The operation unit 20 includes a display 21 and an imaging unit 22. The operation unit 20 displays an operation screen of the analysis device 10 and receives an operation input from a user via the operation screen. The operation unit 20 is detachably connected to the main body 1 via an attachment and detachment mechanism 14.

Figure 2:
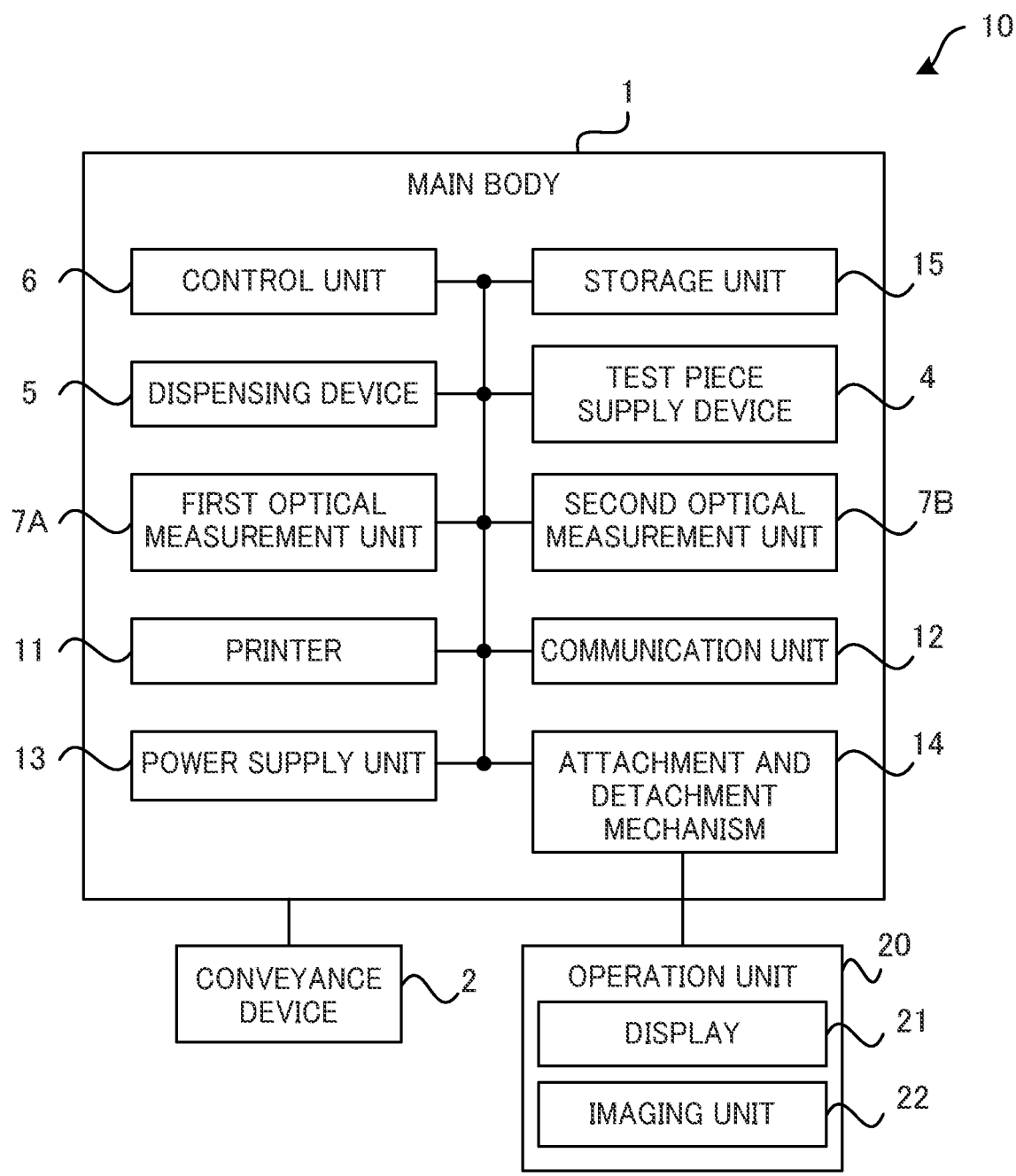
FIG. 2 is a block diagram illustrating an example of a configuration of the analysis device according to the embodiment.

FIG. 2 is a block diagram illustrating an example of a configuration of the analysis device 10 according to the present embodiment.

As illustrated in FIG. 2, the main body 1 of the analysis device 10 according to the present embodiment includes a test piece supply device 4, a dispensing device 5, a control unit 6, a first optical measurement unit 7A, a second optical measurement unit 7B, a printer 11, a communication unit 12, a power supply unit 13, the attachment and detachment mechanism 14, and a storage unit 15.

Figure 3:
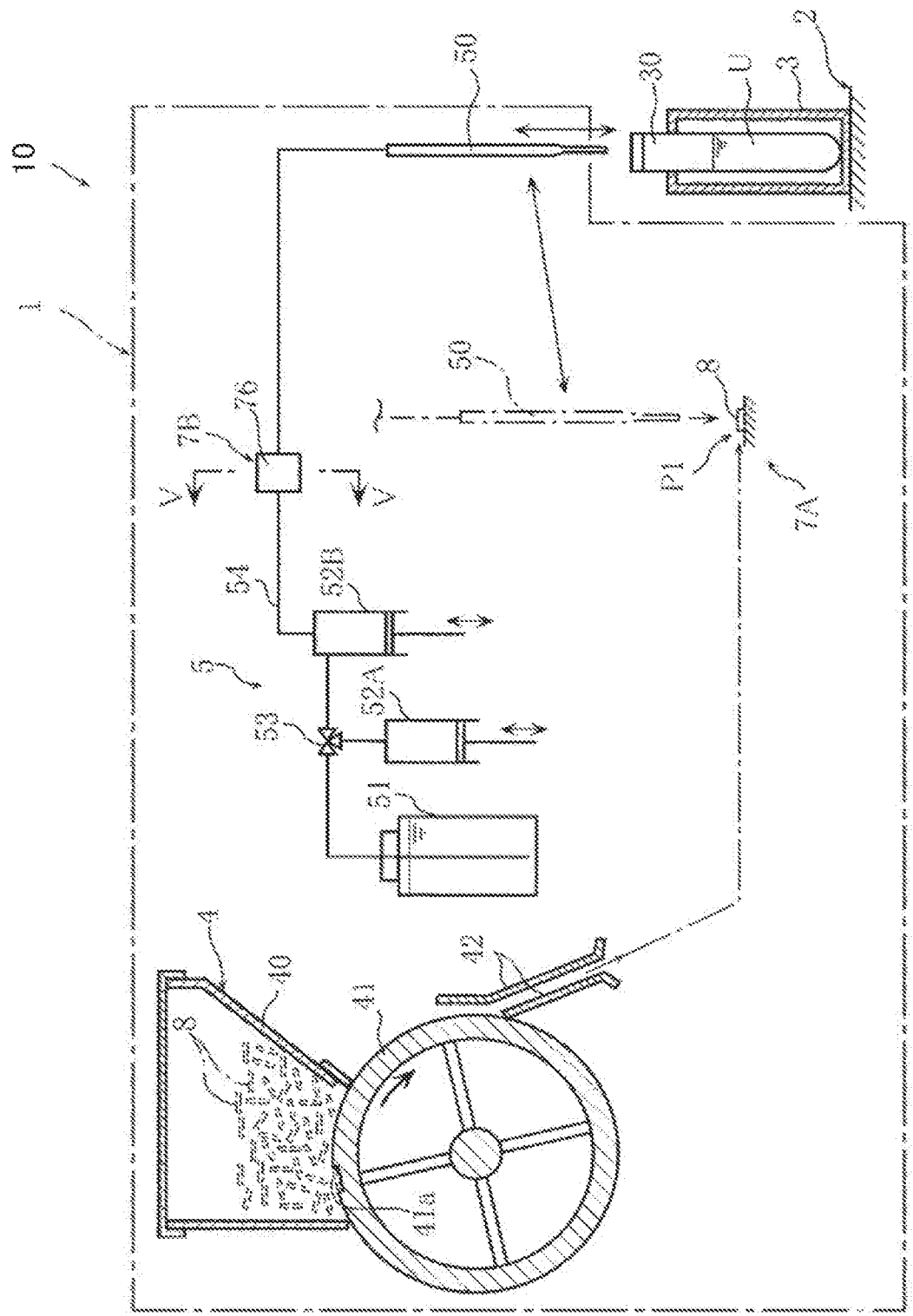
FIG. 3 is a schematic diagram illustrating an example of a configuration of a main part of the analysis device according to the embodiment.

FIG. 3 is a schematic diagram illustrating an example of a configuration of a main part of the analysis device 10 according to the present embodiment.

As illustrated in FIG. 3, the test piece supply device 4 is a device for supplying a test strip 8 for urine analysis to a predetermined position P1 of the first optical measurement unit 7A. The test piece supply device 4 includes a hopper 40 that accommodates a plurality of the test strips 8, and a rotary drum 41 for taking out the test strips 8 one by one from the hopper 40. The rotary drum 41 has a recess 41a on an outer peripheral surface of which only one test strip 8 can be fitted, and when the rotary drum 41 rotates, the test strip 8 fitted in the recess 41a is transferred to the outside of the hopper 40 and introduced into a pair of guides 42. Thereafter, the test strip 8 is transferred to the predetermined position P1 by a transfer device (not illustrated).

The dispensing device 5 can perform an operation of collecting the urine U from the container 30 using the suction nozzle 50 and dispensing (spotting) the collected urine U on the test strip 8. The suction nozzle 50 is vertically and horizontally movable by a drive mechanism (not illustrated). The dispensing device 5 has a function of cleaning the suction nozzle 50. The dispensing device 5 includes a cleaning liquid tank 51 storing a cleaning liquid such as distilled water, syringe pumps 52A and 52B, a direction switching valve 53 such as a three-way valve, and a flow path 54 formed in series from the cleaning liquid tank 51 to the suction nozzle 50. The flow path 54 is configured using an appropriate tube. By the operations of the syringe pumps 52A and 52B, a negative pressure for sucking the urine U and a positive pressure for discharging the urine U can be generated in the suction nozzle 50. Furthermore, after the discharge of the urine U is finished, the cleaning liquid in the cleaning liquid tank 51 can be sent into the suction nozzle 50 to be cleaned. Such a configuration is similar to, for example, a dispensing device described in Japanese Patent Application Laid-Open (JP-A) No. 2000-321270, and details thereof will be omitted. Note that, in the present embodiment, the second optical measurement unit 7B for urine color tone inspection is provided in a middle position of the flow path 54 of the dispensing device 5, which will be described later.

Figure 4:
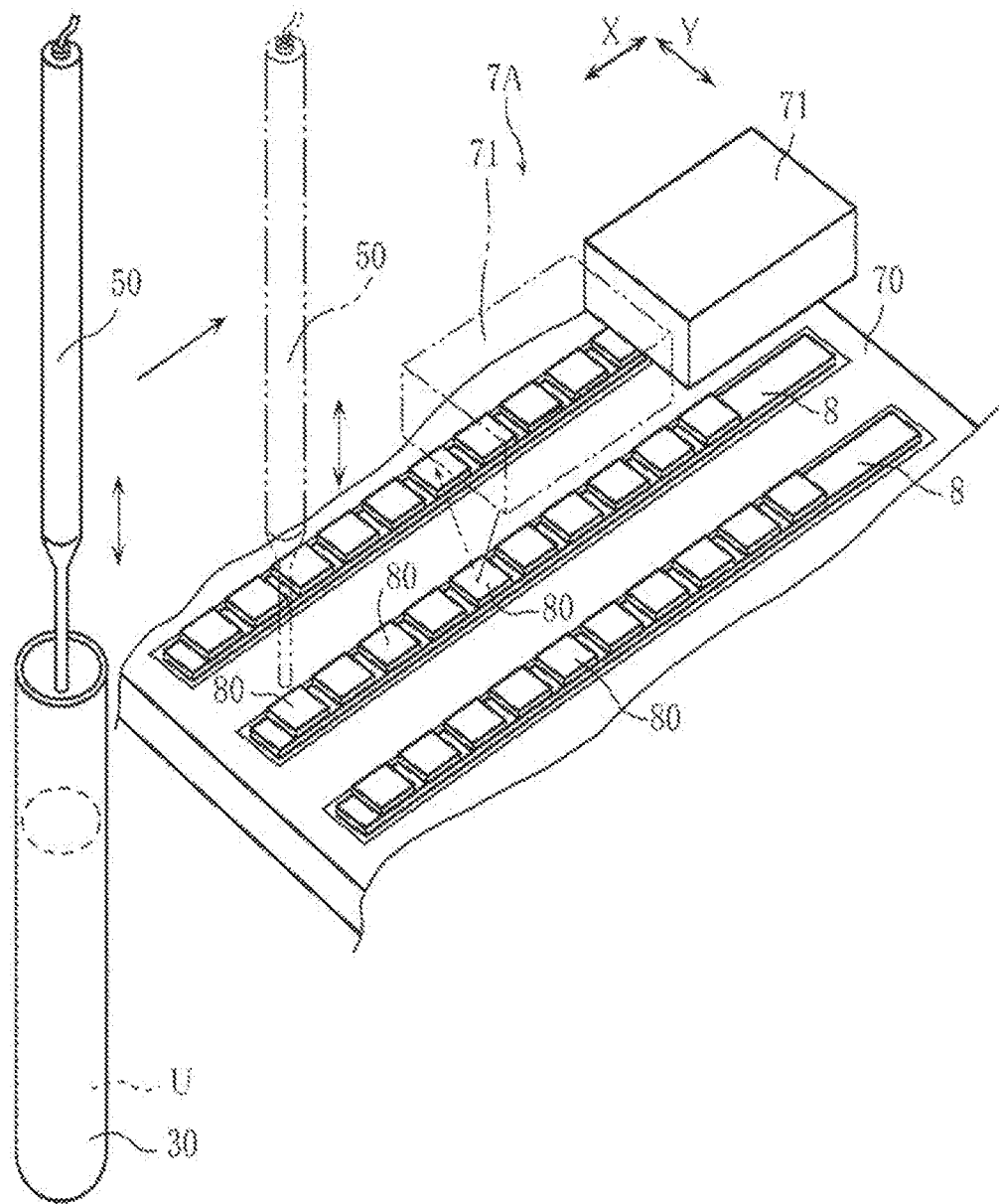
FIG. 4 is a perspective view illustrating an example of a configuration of a main part of a first optical measurement unit according to the embodiment.

FIG. 4 is a perspective view illustrating an example of a main part configuration of the first optical measurement unit 7A according to the present embodiment.

As illustrated in FIG. 4, the first optical measurement unit 7A for detecting a color reaction includes a mounting table 70 for mounting the plurality of test strips 8 and an optical measurement instrument 71. Each of the test strips 8 is provided with a plurality of reagent pads 80, and the urine U collected by the suction nozzle 50 is dispensed onto the reagent pads 80. The plurality of reagent pads 80 contain a reagent that reacts with a predetermined component in the urine U and develops color to a degree corresponding to the concentration of the component. As the reagent, reagents of various components corresponding to the inspection items of the urine U are used. The optical measurement instrument 71 is movable in an X direction and a Y direction, irradiates each of the reagent pads 80 with light of a predetermined wavelength range from a light source after the urine U is spotted, and receives the reflected light by a light receiving element. Light reflectance of the reagent can be measured based on an amount of light received by the light receiving element. This light reflectance corresponds to a degree of color reaction (degree of color development) between a specific component of the urine U and the reagent, and presence or absence or concentration (including a semi-quantitative value) of the specific component in the urine is determined based on this value. This determination may be performed by, for example, the control unit 6 or the first optical measurement unit 7A.

Note that the first optical measurement unit 7A is an example of a measurement unit for detecting a color reaction that measures a color state of the test strip 8 under a defined condition. Examples of the defined condition here include that one or more of an amount of light irradiated to the test strip 8 is constant, the test strip 8 is irradiated with uniform light, a distance between the test strip 8 and the light source is constant, and light having a wavelength suitable for measurement is used in the case of a configuration for reading the reflection of light.

On the other hand, as illustrated in FIG. 3, the second optical measurement unit 7B for urine color tone inspection is provided at a middle position of the flow path 54. The flow path 54 can allow the urine U sucked by the suction nozzle 50 to flow into a cell 75 illustrated in FIG. 5 of the second optical measurement unit 7B.

Figure 5:
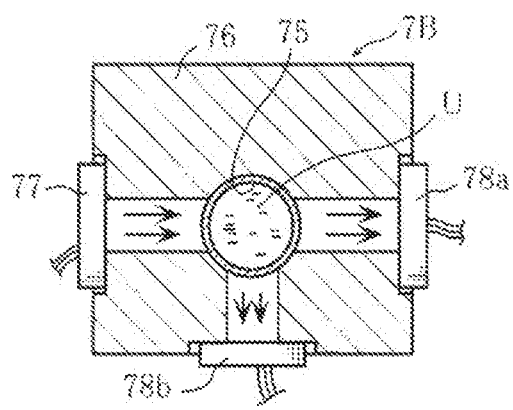
FIG. 5 is a cross-sectional view illustrating a cross section along line V-V illustrated in FIG. 3.

FIG. 5 is a cross-sectional view illustrating a cross section along line V-V illustrated in FIG. 3.

As illustrated in FIG. 5, the second optical measurement unit 7B includes the transparent cylindrical cell 75 into which the urine U flows, a light source 77, and two light receiving elements 78a and 78b attached to a light shielding block 76 surrounding the cell 75. The light source 77 can irradiate the cell 75 with a plurality of types of light with different wavelengths. The light receiving element 78a receives light transmitted through the urine U in the cell 75, and the absorbance of the urine U per predetermined optical path length is obtained based on an amount of light received by the light receiving element 78a. This absorbance is the absorbance of the urine U itself that has not reacted with the reagent. The light receiving element 78b is for receiving light scattered and reflected by the urine U. The turbidity of the urine U can be determined based on an amount of light received by the light receiving element 78b.

In FIG. 2 described above, the printer 11 prints and outputs an analysis result or a determination result of the urine U and data of other predetermined items on a predetermined sheet 9.

The storage unit 15 can be accessed by the control unit 6. The storage unit 15 stores control programs for executing operation control of each unit of the analysis device 10 and for various data processing, and the storage unit 15 also stores various data. Note that the storage unit 15 may be integrally provided in the control unit 6.

The communication unit 12 is a communication interface for performing wireless communication such as a wireless local area network (LAN) or short-range wireless communication such as near field communication (NFC). The communication unit 12 can perform data communication with the operation unit 20 away from the main body 1 by wireless communication.

The power supply unit 13 is a power supply for supplying power to the analysis device 10. The power supply unit 13 is, for example, an alternating current (AC) power supply, a battery, or the like.

In the attachment and detachment mechanism 14, the operation unit 20 is attachable and detachable. The attachment and detachment mechanism 14 may be an interface for electrically connecting the operation unit 20 and the main body 1. The attachment and detachment mechanism 14 may have any structure capable of attaching and detaching the operation unit 20, and the structure is not particularly limited.

The control unit 6 includes, for example, a processor such as a central processing unit (CPU). The control unit 6 executes operation control of each unit of the analysis device 10 and various types of data processing according to the control programs stored in the storage unit 15.

Figure 6:
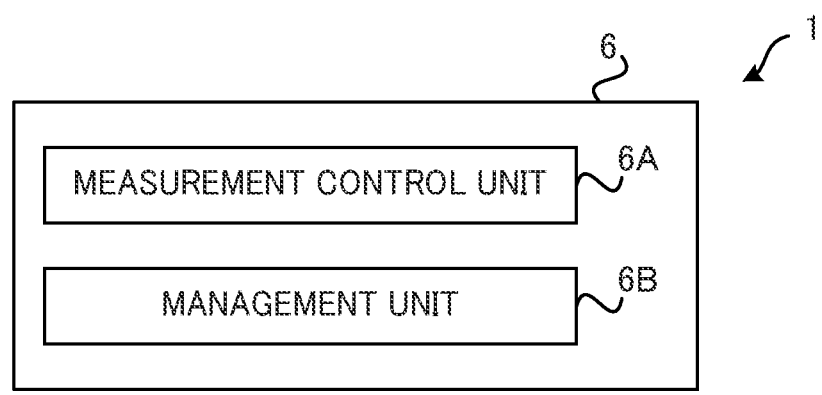
FIG. 6 is a block diagram illustrating an example of a functional configuration of a control unit according to the embodiment.

FIG. 6 is a block diagram illustrating an example of a functional configuration of the control unit 6 according to the present embodiment.

As illustrated in FIG. 6, the control unit 6 according to the present embodiment functions as a measurement control unit 6A and a management unit 6B by executing the control programs stored in the storage unit 15.

The measurement control unit 6A controls a measurement operation of each of the first optical measurement unit 7A and the second optical measurement unit 7B.

The management unit 6B stores and manages each of a measurement result obtained by the measurement by the first optical measurement unit 7A, a determination result obtained based on the measurement result, and a measurement result obtained by the measurement by the second optical measurement unit 7B in the storage unit 15.

By the way, as described above, preparing the backup machine of the analysis device 10 imposes a heavy burden on the user due to the high cost, the necessity of securing the installation place, and the like. For this reason, an analysis device capable of analyzing a test strip without preparing a backup machine is desired.

Figure 7:
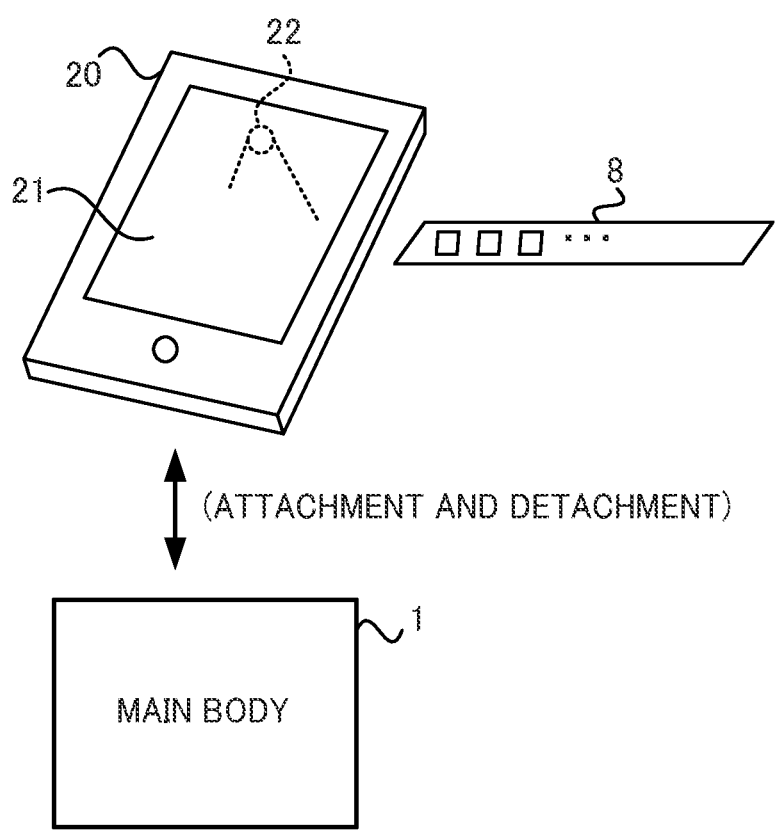
FIG. 7 is a schematic diagram illustrating an example of a state in which a test strip is imaged by an operation unit according to the embodiment.

On the other hand, in the analysis device 10 according to the present embodiment, as an example, as illustrated in FIG. 7, the operation unit 20 is attachable to and detachable from the main body 1. The color state of the test strip 8 can also be analyzed in the operation unit 20 from a captured image obtained by imaging the color state of the test strip 8. That is, because the color state of the test strip 8 can be analyzed from the captured image using the operation unit 20 instead of the first optical measurement unit 7A, it is not necessary to prepare the backup machine.

FIG. 7 is a schematic diagram illustrating an example of a state in which the test strip 8 is imaged by the operation unit 20 according to the present embodiment.

As illustrated in FIG. 7, for example, in a case where the first optical measurement unit 7A cannot be used due to a failure or the like of the main body 1, the operation unit 20 is removed from the main body 1, the color state of the test strip 8 is imaged, and the color state of the test strip 8 is analyzed from the captured image using the operation unit 20.

Next, a specific configuration of the operation unit 20 according to the present embodiment will be described with reference to FIGS. 8 and 9. For example, a portable information processing device such as a tablet terminal, a smartphone, or a notebook personal computer is applied to the operation unit 20.

Figure 8:
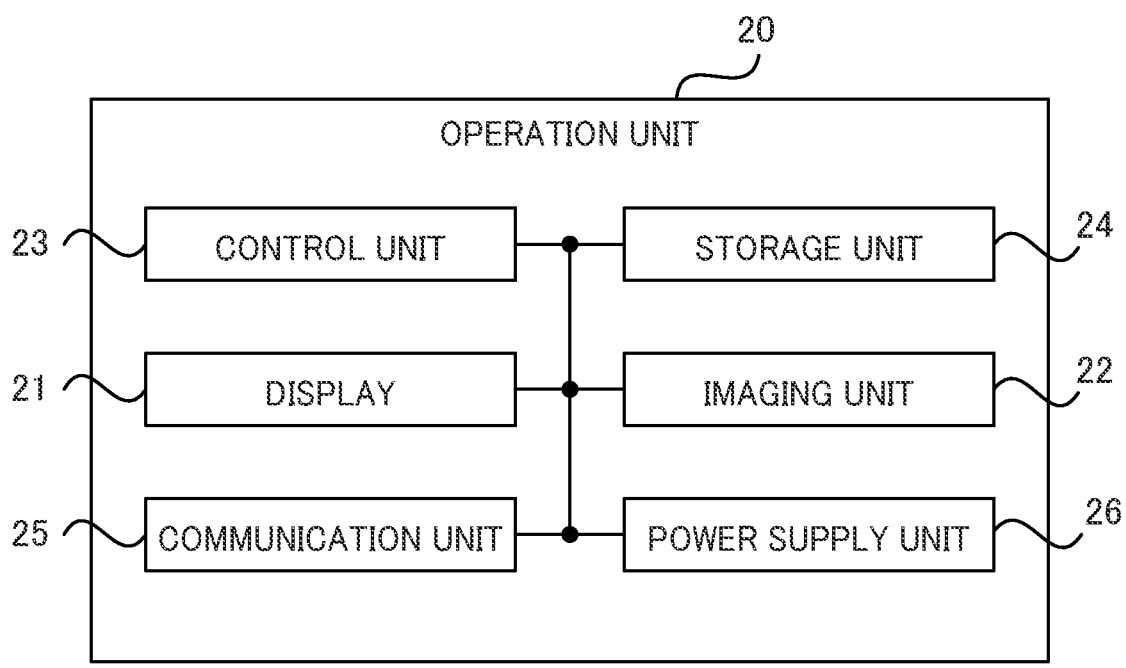
FIG. 8 is a block diagram illustrating an example of a configuration of the operation unit according to the embodiment.

FIG. 8 is a block diagram illustrating an example of a configuration of the operation unit 20 according to the present embodiment.

As illustrated in FIG. 8, the operation unit 20 according to the present embodiment includes the display 21, the imaging unit 22, a control unit 23, a storage unit 24, a communication unit 25, and a power supply unit 26.

The display 21 includes a display screen such as a liquid crystal display panel. The display 21 performs screen display for guiding the operation of the analysis device 10, for example. Note that the analysis result of the urine U may be displayed on the display 21. The display 21 integrally includes, for example, a touch panel.

The imaging unit 22 is a camera for capturing an image of a color state of the test strip 8 on which a specimen (for example, urine U) is spotted and for acquiring the captured image.

The storage unit 24 can be accessed by the control unit 23. The storage unit 24 stores control programs for executing operation control of each unit of the operation unit 20 and for various data processing, and the storage unit 24 also stores various data. Note that the storage unit 24 may be integrally provided in the control unit 23.

The communication unit 25 is a communication interface for performing wireless communication such as wireless LAN or short-range wireless communication such as NFC. The communication unit 25 can perform data communication with the main body 1 away from the operation unit 20 by wireless communication.

The power supply unit 26 is a power supply for supplying power to the operation unit 20, and is, for example, a battery or the like. The power supply unit 26 is a power supply independent of the power supply unit 13 on a side of the main body 1. The power supply unit 26 can supply power to the operation unit 20 even when the main body 1 is powered off. Furthermore, in a case where the operation unit 20 is attached to the attachment and detachment mechanism 14 of the main body 1 and power can be supplied from the main body 1, the power supply from the power supply unit 26 is automatically stopped, and power is controlled to be supplied from the power supply unit 13 on the side of the main body 1. At this time, the power supply unit 26 is charged by the power supplied from the power supply unit 13 on the side of the main body 1.

The control unit 23 includes, for example, a processor such as a CPU. The control unit 23 executes operation control of each unit of the operation unit 20 and various data processing according to the control programs stored in the storage unit 24.

Figure 9:
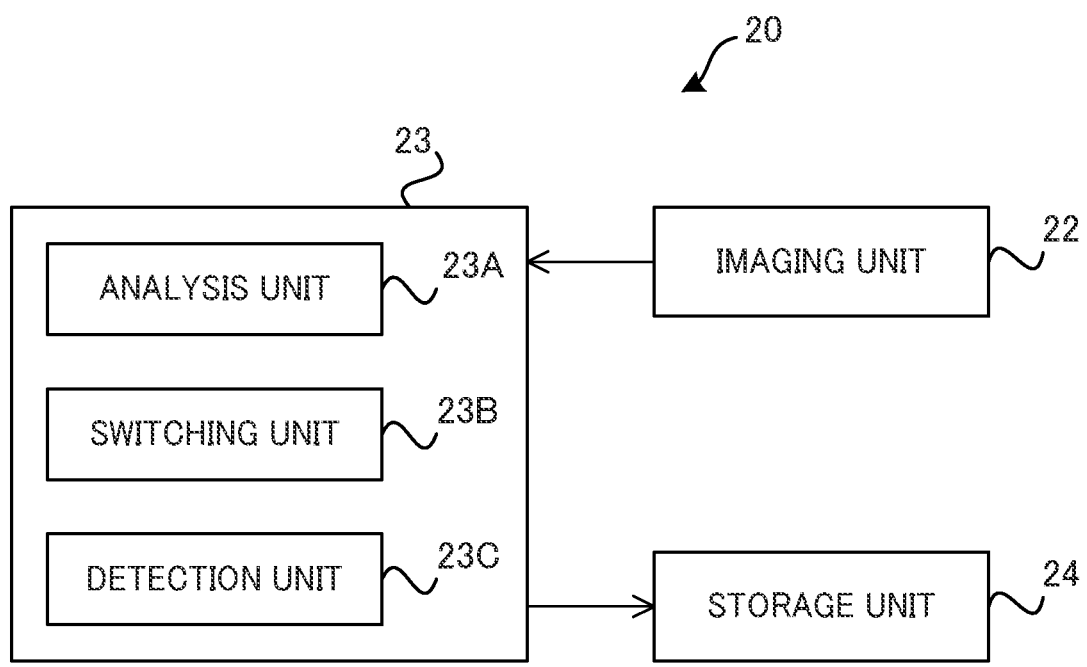
FIG. 9 is a block diagram illustrating an example of a functional configuration of the control unit according to the embodiment.

FIG. 9 is a block diagram illustrating an example of a functional configuration of the control unit 23 according to the present embodiment.

As illustrated in FIG. 9, the control unit 23 according to the present embodiment functions as an analysis unit 23A, a switching unit 23B, and a detection unit 23C by executing the control programs stored in the storage unit 24. Stated more generally, each of the analysis unit 23A, the switching unit 23B, and the detection unit 23C may comprise any combination of hardware and software. For example, each can include a respective processor executing instructions stored in a memory to perform its functions. Each can comprise a hardware component configured to perform its functions. For example, the hardware component can be an application specific integrated circuit (ASIC), a field-programmable gate array (FPGA), etc., coupled to inputs and outputs such as a user interface.

As an example, as illustrated in FIG. 7 described above, the analysis unit 23A analyzes the color state of the test strip 8 from the captured image obtained by imaging the color state of the test strip 8 by the imaging unit 22. Note that a specimen (for example, urine U) is spotted on the test strip 8 in advance. As a method of analyzing the color state by the captured image, for example, a known method is used as described in JP-A No. 2012-202989 described above. An analysis result analyzed by the analysis unit 23A corresponds to the degree of color reaction (degree of color development) between the specific component of the urine U and the reagent, and the presence or absence or the concentration (including a semi-quantitative value) of the specific component in the urine is determined based on this value. This determination may be performed by the analysis unit 23A or may be performed by the control unit 23. Furthermore, the analysis result analyzed by the analysis unit 23A and the determination result may be output to and stored in the storage unit 24, or one or more of these results may be output to and displayed on the display 21.

The switching unit 23B selectively switches between a first mode in which the color state is measured by the first optical measurement unit 7A and a second mode in which the color state is analyzed from the captured image by the analysis unit 23A. In the default (initial state), for example, the first mode is set. As an example, as illustrated in FIG. 10, the switching unit 23B switches to the second mode in accordance with an operation by the user.

Figure 10:
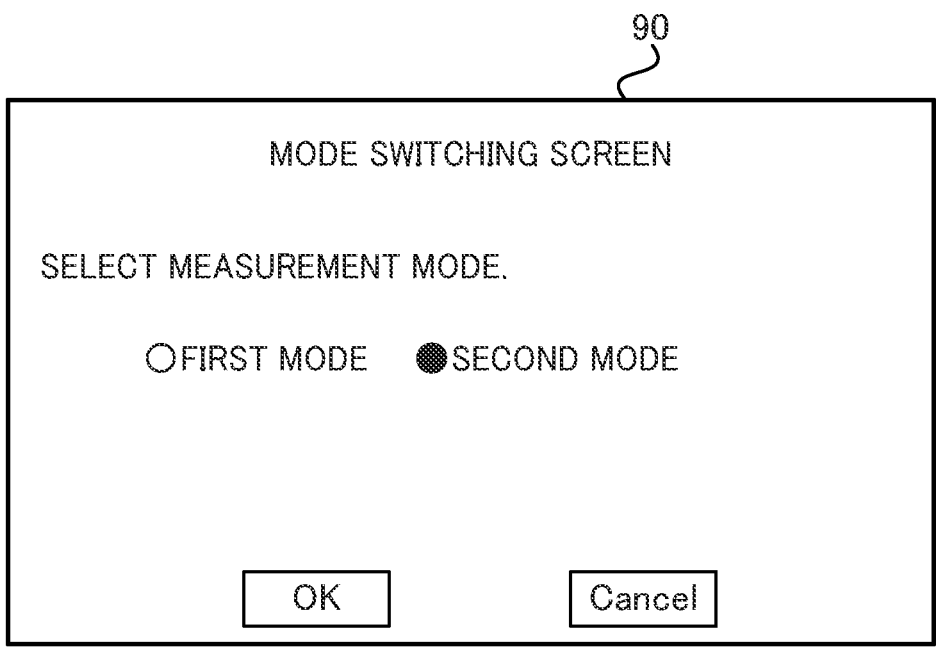
FIG. 10 is a front view illustrating an example of a mode switching screen according to the embodiment.

FIG. 10 is a front view illustrating an example of a mode switching screen 90 according to the present embodiment. The mode switching screen 90 illustrated in FIG. 10 is displayed on the display 21.

As illustrated in FIG. 10, when the user selects one of the first mode and the second mode and presses an "OK" button on the mode switching screen 90, the mode is switched to the selected mode. That is, the mode switching screen 90 may be a user interface of a touchscreen display. Alternatively, the mode switch screen 90 may be operated by keystrokes. In either case, a user can switch between the modes.

Here, the mode switching may be automatically performed instead of the operation by the user. Specifically, the detection unit 23C detects whether measurement cannot be performed by the first optical measurement unit 7A. Note that a condition under which the measurement cannot be performed includes, for example, at least one of a case where a failure occurs in the first optical measurement unit 7A or a case where the power supply of the analysis device 10 is turned off at the time of power outage or at night (that is, in a case where power is not supplied from the power supply unit 13). Furthermore, the condition under which the measurement cannot be performed includes a case where a failure occurs in the control unit 6, a case where the analysis device 10 is locked, and the like. Furthermore, a case where a user other than a person in charge of operation performs an operation may be included as the condition under which the measurement cannot be performed. Specifically, it is conceivable to determine a user identification (ID) in which an attribute of each user (whether or not the user is a person in charge of operation) is associated in advance and to specify the person in charge of operation and the others. Note that the user ID can be acquired, for example, by reading code information such as a barcode or a secondary code attached to an ID card or the like.

In this case, the switching unit 23B switches to the second mode when the detection unit 23C detects that the measurement cannot be performed. Although the switching unit 23B is described herein as comprising a hardware component configured to switch between the first mode and the second mode, software stored in memory that can perform the switch, or both, the switching unit 23B can have a mechanical implementation. For example, mechanical relays may be activated to switch between the first mode and the second mode (e.g., in response to a signal from a user interface or from the detection unit 23C).

Furthermore, the detection unit 23C may further detect an operation state of a peripheral device of the analysis device 10. The peripheral device referred to herein includes various devices connectable to the analysis device 10. The peripheral device also includes the conveyance device 2. In this case, the switching unit 23B switches to the second mode on the basis of the operation state detected by the detection unit 23C. For example, in a case where the peripheral device is unusable due to a failure or the like, the mode is switched to the second mode.

Here, the switching unit 23B and the detection unit 23C may be provided in the main body 1 instead of the operation unit 20. Furthermore, in a case where the switching unit 23B is provided in the operation unit 20 and the detection unit 23C is provided in the main body 1, the operation unit 20 receives a detection result of the detection unit 23C from the main body 1.

That is, the analysis device 10 according to the present embodiment includes the main body 1 including the first optical measurement unit 7A and includes the operation unit 20 attachable to and detachable from the main body 1. The operation unit 20 includes the imaging unit 22 and the analysis unit 23A.

Furthermore, the main body 1 and the operation unit 20 each include a processor, and the operation unit 20 is operable independently from the main body 1. Furthermore, the processor of the operation unit 20 cooperates with the processor of the main body 1. The processor of the operation unit 20 can monitor an operation state of each unit constituting the main body 1 or a peripheral device connected to the main body 1.

Furthermore, the operation unit 20 transmits the analysis result analyzed by the analysis unit 23A and the determination result obtained on the basis of the analysis result to the main body 1 via the communication unit 25. The management unit 6B (see FIG. 6) on the side of the main body 1 collectively manages the measurement result by the first optical measurement unit 7A and the determination result obtained based on the measurement result, and the analysis result by the analysis unit 23A and the determination result obtained based on the analysis result in the storage unit 15. At this time, the management unit 6B desirably manages the analysis result by the analysis unit 23A and the determination result obtained based on the analysis result, and the measurement result by the first optical measurement unit 7A and the determination result obtained based on the measurement result, in a distinguishable manner. For example, the data is managed by describing that it is a determination result obtained based on the analysis result by the analysis unit 23A and that it is a determination result obtained based on the measurement result by the first optical measurement unit 7A. Alternatively or additionally, in a case where the analysis result by the analysis unit 23A is displayed on the display 21, the data is managed such that the display form of the analysis result by the analysis unit 23A is different from the display form of the measurement result by the first optical measurement unit 7A. The display form mentioned here is, for example, color, size, font, underline, italic, or a combination thereof. As a result, the user can easily recognize that it is the analysis result by the analysis unit 23A.

Next, the action of the analysis device 10 according to the present embodiment will be described with reference to FIG. 11.

Figure 11:
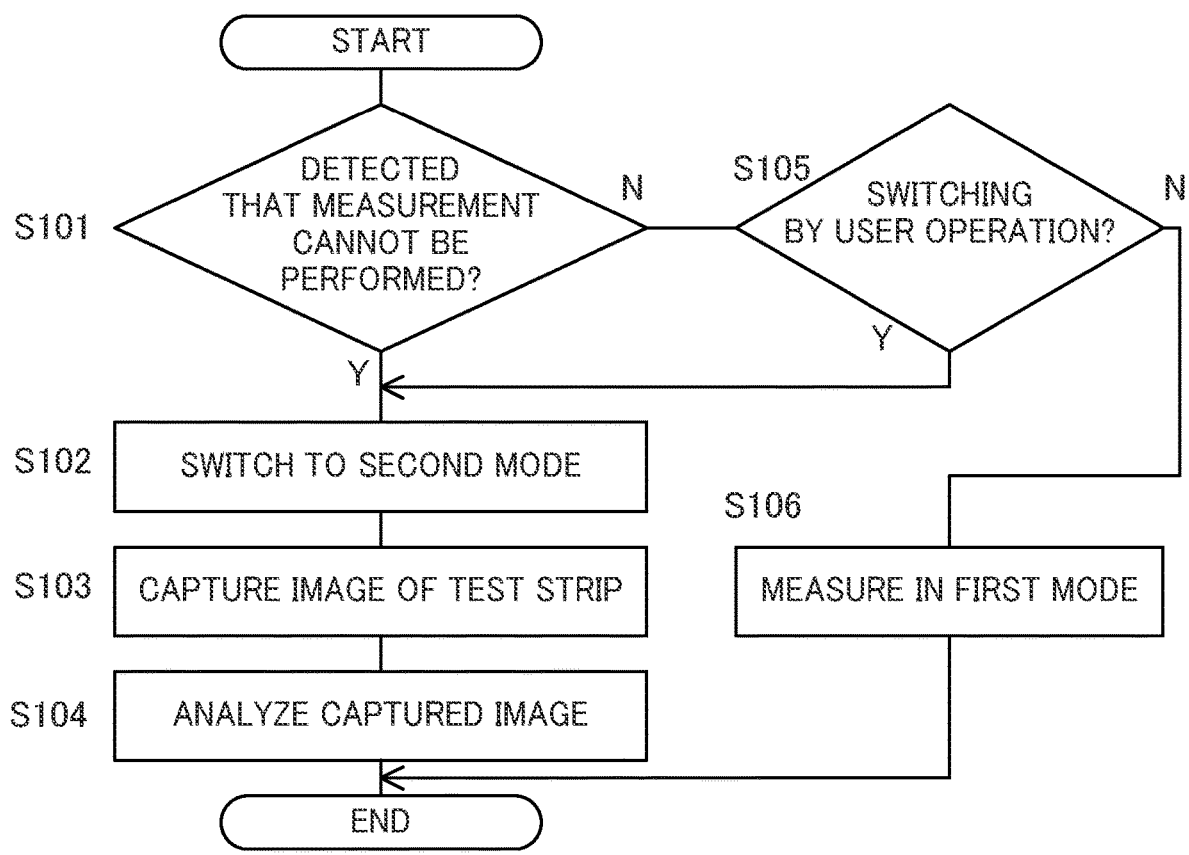
FIG. 11 is a flowchart illustrating an example of a flow of processing of an analysis method by the analysis device according to the embodiment.

FIG. 11 is a flowchart illustrating an example of a flow of processing of the analysis method by the analysis device 10 according to the present embodiment. Note that, in the default (initial state), the measurement mode is set to the first mode.

In step S101 of FIG. 11, it is determined whether or not the operation unit 20 of the analysis device 10 has detected that the measurement of the main body 1 cannot be performed when receiving the user's operation. Note that the condition under which the measurement cannot be performed is as follows. As described above, at least one of a case where a failure occurs in the first optical measurement unit 7A or a case where the power supply of the analysis device 10 is turned off at the time of power outage or at night (that is, in a case where power is not supplied from the power supply unit 13) is included. In a case where it is determined that it has been detected that the measurement of the main body 1 cannot be performed (in the case of affirmative determination), the processing proceeds to step S102, and in a case where it is determined that it has not been detected that the measurement of the main body 1 cannot be performed (in the case of negative determination), the processing proceeds to step S105.

In step S102, the operation unit 20 switches the measurement mode from the first mode to the second mode, and the processing proceeds to step S103.

In step S103, the operation unit 20 causes the imaging unit 22 to capture an image of the color state of the test strip 8 on which the specimen (for example, urine U) is spotted, and the imaging unit 22 acquires the captured image. Note that, as an example, as illustrated in FIG. 7 described above, the operation unit 20 performs imaging in a state of being detached from the main body 1.

In step S104, the operation unit 20 analyzes the color state of the test strip 8 from the captured image acquired in step S103, displays the analysis result or the determination result on the display 21, and transmits the analysis result to the main body 1 via the communication unit 25. The series of processing then ends.

On the other hand, in step S105, as an example, the operation unit 20 determines whether or not there is an instruction to switch the mode by a user operation from the mode switching screen 90 illustrated in FIG. 10 described above. In a case where it is determined that there is an instruction to switch the mode by the user operation (in the case of affirmative determination), the processing proceeds to step S102. In a case where it is determined that there is no instruction to switch the mode by the user operation (in the case of negative determination), the processing proceeds to step S106.

In step S106, the main body 1 measures the color state of the test strip 8 by the first optical measurement unit 7A, displays the measurement result on the display 21, stores the measurement result in the storage unit 15. The series of processing then ends.

Here, in the above embodiment, a form in which the first optical measurement unit 7A is applied as an example of a measurement unit on the side of the main body 1 has been described, but a form in which an analysis unit that analyzes the color state of the test strip from the captured image is applied may be adopted as a measurement unit on the side of the main body 1. That is, the measurement unit on the side of the main body 1 is not limited to the form of measuring the reflectance of the test strip, and the measurement unit may be the form of analyzing the color state from the captured image.

Furthermore, in the image analysis processing in the operation unit 20, the accuracy of the analysis result may be affected by imaging conditions such as the light amount and the imaging angle of the imaging unit 22. Specifically, there is a case where the imaging under a defined condition cannot be performed, and the quality of the captured image changes depending on the environment in which the imaging unit 22 images the color state of the test strip 8 or an operator who performs the imaging. In such a case, the accuracy of the analysis result is affected. For this reason, the person in charge of operation needs to strictly align the imaging conditions, and thus needs more attention by the person than the measurement in the first optical measurement unit 7A. Deterioration in workability, an operation error, and the like may occur. Therefore, the mode switching by the user operation may be prohibited, and the image analysis processing by the analysis unit 23A may be performed only when the measurement in the first optical measurement unit 7A cannot be performed. In this case, the image analysis processing of the test strip 8 by the operation unit 20 is disabled except when the detection unit 23C detects a device state (whether or not measurement can be performed) and measurement in the main body 1 cannot be performed. Specifically, for example, a method of prohibiting the use of the imaging unit 22, prohibiting the execution of the image analysis processing by the analysis unit 23A, or locking the attachment and detachment mechanism 14 so that the operation unit 20 is not detached from the main body 1 can be considered.

Furthermore, depending on the state of the analysis device 10, the method of specimen spotting on the test strip 8 to be analyzed in the operation unit 20 may be different. Specifically, it is conceivable to indicate the specimen spotting method to the user through the operation unit 20 according to the state of the analysis device 10. For example, in a case where there is some abnormality in the dispensing device 5 or the analysis device 10 is not activated, a manual spotting method is presented. Furthermore, in a case where there is some abnormality in the first optical measurement unit 7A, a method of automatically spotting by the dispensing device 5 is presented.

Furthermore, as described above, after imaging by the imaging unit 22, the image analysis processing may be executed by the analysis unit 23A, and the analysis result may be displayed on the display 21. At this time, the analysis result of the analysis unit 23A is transmitted from the operation unit 20 to the main body 1, and the analysis result is collectively managed with the measurement result in the first optical measurement unit 7A of the main body 1. Furthermore, the analysis result of the analysis unit 23A is displayed on the display 21 to be distinguishable from the measurement result of the first optical measurement unit 7A. Therefore, the user can recognize that it is the analysis result of the analysis unit 23A. At this time, a display for prompting the first optical measurement unit 7A to perform re-measurement may be displayed.

Furthermore, at the time of imaging by the operation unit 20, method may be used to improve the quality of an analysis result and a determination result based on the captured image. For example, the test strip 8 may be installed on a dedicated sheet with a color sample. Furthermore, to make a distance between the test strip 8 and the imaging unit 22 constant, a frame of the size of the test strip 8 or the like may be displayed on the screen at the time of imaging of the operation unit 20.

As described above, according to the present embodiment, the operation unit is attachable to and detachable from the main body, and the color state of the test strip can also be analyzed from a captured image obtained by capturing an image of the color state of the test strip in the operation unit. That is, because the color state of the test strip can be analyzed from the captured image using the operation unit instead of the measurement unit on the side of the main body, it is not necessary to prepare a backup machine.

Furthermore, even in a case where the measurement unit on the side of the main body cannot be used, alternative measurement can be easily performed by using the operation unit provided in the analysis device.

Furthermore, because the measurement result by the measurement unit on the side of the main body and the analysis result by the operation unit are collectively managed in a distinguishable manner by the analysis device, the user can easily recognize that the analysis result is an analysis result by the operation unit.

Next, a configuration of another analysis device according to the present embodiment will be described with reference to FIG. 12.

Figure 12:
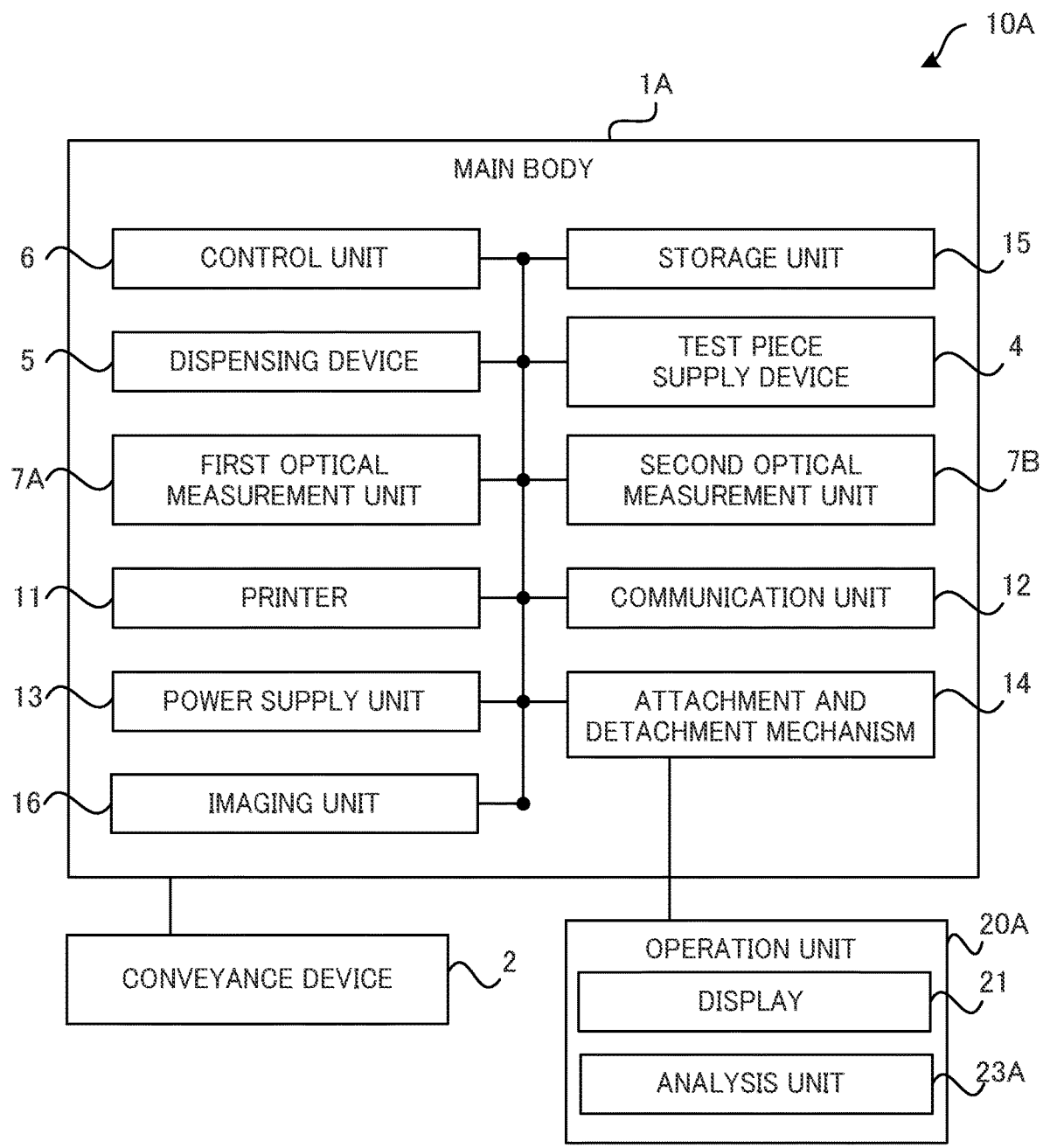
FIG. 12 is a block diagram illustrating an example of a configuration of another analysis device according to the embodiment.

FIG. 12 is a block diagram illustrating an example of a configuration of another analysis device 10A according to the present embodiment.

As illustrated in FIG. 12, an analysis device 10A according to the present embodiment includes a main body 1A, an operation unit 20A, and the conveyance device 2. Furthermore, the main body 1A includes the test piece supply device 4, the dispensing device 5, the control unit 6, the first optical measurement unit 7A, the second optical measurement unit 7B, the printer 11, the communication unit 12, the power supply unit 13, the attachment and detachment mechanism 14, the storage unit 15, and the imaging unit 16. Furthermore, the operation unit 20A includes the display 21 and the analysis unit 23A.

In the example of FIG. 2 described above, the configuration in which the imaging unit 22 is provided on a side of the operation unit 20 has been described, but as another form, the imaging unit 16 may be provided on a side of the main body 1A. That is, the analysis device 10A includes the main body 1A including the first optical measurement unit 7A and the operation unit 20A attachable to and detachable from the main body 1A. The main body 1A includes the imaging unit 16, and the operation unit 20A includes the analysis unit 23A.

An installation position of the imaging unit 16 in the main body 1A is not particularly limited so long as it is an installation position where the test strip 8 can be appropriately imaged. In a case where the operation unit 20A is attached to the main body 1A, a captured image captured by the imaging unit 16 is sent to the operation unit 20A, and image analysis processing is executed by the analysis unit 23A of the operation unit 20A. Furthermore, in a case where the operation unit 20A is detached from the main body 1A, a captured image captured by the imaging unit 16 is transmitted to the operation unit 20A via the communication unit 12, and image analysis processing is executed by the analysis unit 23A of the operation unit 20A.

Furthermore, instead of using the imaging unit 22 of the operation unit 20 or the imaging unit 16 of the main body 1A, a camera of another mobile terminal (for example, a smartphone or the like) may be used. In this case, a captured image obtained by imaging the test strip 8 with the camera of the mobile terminal is transmitted to the operation units 20 and 20A, and the image analysis processing is executed by the analysis unit 23A of the operation units 20 and 20A. Note that the analysis unit 23A may be provided in the main bodies 1 and 1A instead of the operation units 20 and 20A, and the image analysis processing may be executed by the main bodies 1 and 1A.

Regarding the above embodiments, the following is further disclosed.

An analysis device according to a first aspect includes a measurement unit that measures a color state of a test strip under a defined condition, an imaging unit that captures an image of the color state of the test strip, an analysis unit that analyzes the color state from the captured image obtained by imaging by the imaging unit, and a switching unit that selectively switches between a first mode in which the measurement unit measures the color state and a second mode in which the analysis unit analyzes the color state from the captured image.

An analysis device according to a second aspect is the analysis device according to the first aspect that further includes a main body including the measurement unit, and an operation unit attachable to and detachable from the main body, in which the operation unit includes the imaging unit and the analysis unit.

An analysis device according to a third aspect is the analysis device according to the first aspect that further includes a main body including the measurement unit, and an operation unit attachable to and detachable from the main body, in which the main body includes the imaging unit, and the operation unit includes the analysis unit.

An analysis device according to a fourth aspect is the analysis device according to any one of the first to third aspects, in which the switching unit switches to the second mode in accordance with an operation by a user.

An analysis device according to a fifth aspect is the analysis device according to any one of the first to third aspects that further includes a detection unit that detects that measurement by the measurement unit cannot be performed, in which the switching unit switches to the second mode in a case in which the detection unit detects that the measurement cannot be performed.

An analysis device according to a sixth aspect is the analysis device according to the fifth aspect, in which a condition under which the measurement cannot be performed includes at least one of a case in which a failure occurs in the measurement unit or a case in which a power supply of the analysis device is turned off.

An analysis device according to a seventh aspect is the analysis device according to the fifth or sixth aspect, in which the detection unit further detects an operation state of a peripheral device of the analysis device, and the switching unit switches to the second mode based on the operation state detected by the detection unit.

An analysis device according to an eighth aspect is the analysis device according to any one of the first to seventh aspects that further includes a management unit that collectively manages at least one of a measurement result by the measurement unit or a determination result of presence or absence or concentration of a specific component in a specimen obtained based on the measurement result, and at least one of an analysis result by the analysis unit or a determination result of presence or absence or concentration of the specific component in the specimen obtained based on the analysis result.

An analysis device according to a ninth aspect is the analysis device according to the eighth aspect, in which the management unit manages at least one of the analysis result by the analysis unit or the determination result of the presence or absence or the concentration of the specific component in the specimen obtained based on the analysis result, and at least one of the measurement result by the measurement unit or the determination result of the presence or absence or the concentration of the specific component in the specimen obtained based on the measurement result in a distinguishable manner.

An analysis device according to a tenth aspect is the analysis device according to the first aspect that further includes a main body including the measurement unit, and an operation unit attachable to and detachable from the main body, in which each of the main body and the operation unit includes a processor, and the operation unit is operable independently from the main body.

What is claimed is:

1. An analysis device for determining a presence or an absence of a specific component of urine, comprising:
    a measurement unit that measures a color state of a test strip spotted with urine;
    an imaging unit that captures an image of the color state of the test strip;
    an analysis unit that analyzes the color state from the captured image obtained by imaging by the imaging unit; and
    a switching unit that selectively switches between a first mode in which the measurement unit measures the color state from the test strip spotted with urine, wherein an output from the measurement unit determines the presence or the absence of the specific component of urine, and a second mode in which the analysis unit analyzes the color state from the captured image, wherein an output from the analysis unit determines the presence or the absence of the specific component of urine.

2. The analysis device according to claim 1, further comprising:
    a main body including the measurement unit; and
    an operation unit attachable to and detachable from the main body,
    wherein the operation unit includes the imaging unit and the analysis unit.

3. The analysis device according to claim 1, further comprising:
    a main body including the measurement unit; and
    an operation unit attachable to and detachable from the main body,
    wherein:
    the main body includes the imaging unit, and
    the operation unit includes the analysis unit.

4. The analysis device according to claim 1, wherein the switching unit switches to the second mode in accordance with an operation by a user.

5. The analysis device according to claim 1, further comprising:
    a detection unit that detects whether measurement by the measurement unit cannot be performed,
    wherein the switching unit switches to the second mode in a case in which the detection unit detects that the measurement cannot be performed.

6. The analysis device according to claim 5, wherein a condition under which the measurement cannot be performed includes at least one of a case in which a failure has occurred in the measurement unit or a case in which a power supply of the analysis device is off.

7. The analysis device according to claim 5, wherein:
    the detection unit further detects an operation state of a peripheral device of the analysis device, and
    the switching unit switches to the second mode based on the operation state detected by the detection unit.

8. The analysis device according to claim 1, further comprising:
    a management unit that collectively manages at least one of a measurement result by the measurement unit or a determination result of the specific component of urine obtained based on the measurement result, and at least one of an analysis result by the analysis unit or a determination result of the specific component of the urine obtained based on the analysis result, wherein each determination result comprises at least one of a concentration of the specific component or a presence or an absence of the specific component.

9. The analysis device according to claim 1, wherein
    a management unit that manages at least one of an analysis result by the analysis unit or a determination result of the specific component of urine obtained based on the analysis result, and at least one of a measurement result by the measurement unit or a determination result of the specific component of urine obtained based on the measurement result, in a distinguishable manner, and each determination result comprises at least one of a concentration of the specific component or a presence or an absence of the specific component.

10. The analysis device according to claim 1, further comprising:

a main body including the measurement unit; and an operation unit attachable to and detachable from the main body, wherein:

each of the main body and the operation unit includes a processor, and the operation unit is operable independently from the main body.

11. The analysis device according to claim 1, wherein the switching unit comprises a processor configured to execute instructions stored in a memory to switch to the second mode responsive to one of failure of the measurement unit or no power supplied to the analysis device.

12. The analysis device according to claim 11, wherein the switching unit includes a user interface through which a user can switch between the first mode and the second mode.

13. The analysis device according to claim 1, wherein the switching unit comprises a hardware component configured to switch between the first mode and the second mode.

14. The analysis device according to claim 13, wherein the switching unit includes a user interface through which a user can switch between the first mode and the second mode.

* * * * *